United States Patent
Kobayashi

(10) Patent No.: US 8,169,932 B2
(45) Date of Patent: May 1, 2012

(54) QOS DEGRADATION POINT ESTIMATION METHOD, QOS DEGRADATION POINT ESTIMATION DEVICE, AND PROGRAM

(75) Inventor: Masayoshi Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 73 days.

(21) Appl. No.: 12/527,683

(22) PCT Filed: Feb. 26, 2008

(86) PCT No.: PCT/JP2008/053325
§ 371 (c)(1),
(2), (4) Date: Aug. 18, 2009

(87) PCT Pub. No.: WO2008/108231
PCT Pub. Date: Sep. 12, 2008

(65) Prior Publication Data
US 2010/0118718 A1    May 13, 2010

(30) Foreign Application Priority Data

Feb. 26, 2007   (JP) ................. 2007-045177

(51) Int. Cl.
*H04J 1/16* (2006.01)

(52) U.S. Cl. .................. 370/252; 370/395.21

(58) Field of Classification Search ........... 370/229, 370/235, 237, 241, 248, 252, 351, 389, 395.1, 370/395.2, 395.21, 395.3, 395.31
See application file for complete search history.

(56) References Cited

U.S. PATENT DOCUMENTS

| | | | |
|---|---|---|---|
| 6,094,687 A * | 7/2000 | Drake et al. | 709/241 |
| 6,807,156 B1 * | 10/2004 | Veres et al. | 370/252 |
| 2002/0054567 A1 * | 5/2002 | Fan | 370/230 |
| 2004/0170173 A1 * | 9/2004 | Pan et al. | 370/392 |
| 2007/0189180 A1 * | 8/2007 | Schelen et al. | 370/252 |
| 2008/0080376 A1 * | 4/2008 | Adhikari et al. | 370/231 |

FOREIGN PATENT DOCUMENTS

| | | | |
|---|---|---|---|
| JP | 2002271392 A | | 9/2002 |
| JP | 2006238052 A | | 9/2006 |
| WO | 2005013567 A | | 2/2005 |
| WO | 2006137373 A | | 12/2006 |

OTHER PUBLICATIONS

International Search Report for PCT/JP2008/053325 mailed Jun. 10, 2008.

* cited by examiner

*Primary Examiner* — Kwang B Yao
*Assistant Examiner* — Obaidul Huq

(57) ABSTRACT

A QoS degradation point estimation device includes a flow set decision unit, a flow quality information collection unit, a path information collection unit, a flow link table management unit, and a QoS degradation point estimation unit. Before generating a flow link table associating QoS of a flow through a network with a link the flow passes through, the flow set decision unit preferentially selects a flow passing through almost ½ of the links of the network as a flow to be registered in the table. The flow quality information collection unit collects information of the QoS of the flow. The path information collection unit collects path information of the network. The flow link table management unit generates the table based on the information of the QoS and the path information. The QoS degradation point estimation unit estimates a QoS degradation link based on the table.

36 Claims, 11 Drawing Sheets

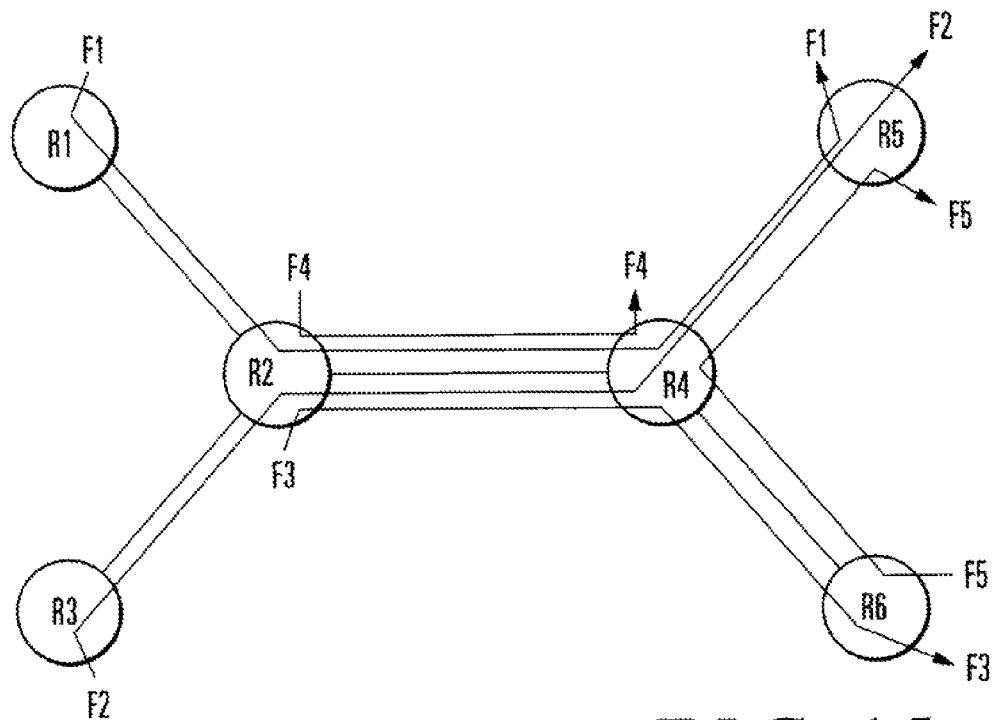
F I G. 15
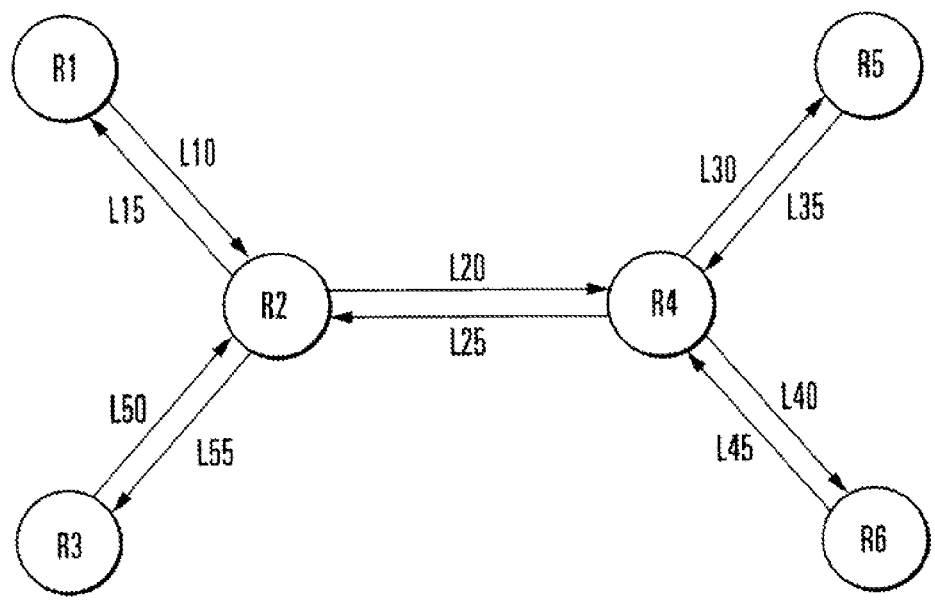
F I G. 16

|     | L10 | L20 | L30 | L45 | L50 | L40 | QoS (PACKET LOSS RATE) |
| --- | --- | --- | --- | --- | --- | --- | --- |
| F1  | 1   | 1   | 1   |     |     |     | 3.0% |
| F2  |     | 1   | 1   |     | 1   |     | 2.5% |
| F3  |     | 1   |     |     |     | 1   | 3.5% |
| F4  |     | 1   |     |     |     |     | 1.0% |
| F5  |     |     | 1   | 1   |     |     | 0.5% |

FIG. 17

|     | L10 | L20 | L30 | L45 | L50 | L40 | QoS (PACKET LOSS RATE) |
| --- | --- | --- | --- | --- | --- | --- | --- |
| F1  | 1   | 1   | 1   |     |     |     | 3.0% |
| F2  |     | 1   | 1   |     | 1   |     | 2.5% |
| F3  |     | 1   |     |     |     | 1   | 3.5% |
| F4  |     | 1   |     |     |     |     | 1.0% |
| F5  |     |     | 1   | 1   |     |     | 0.5% |

FIG. 18

|     | L10 | L20 | L50 | L40 |
| --- | --- | --- | --- | --- |
| F1  | 1   | 1   |     |     |
| F2  |     | 1   | 1   |     |
| F3  |     | 1   |     | 1   |

FIG. 19

QOS DEGRADATION POINT ESTIMATION METHOD, QOS DEGRADATION POINT ESTIMATION DEVICE, AND PROGRAM

This application is the National Phase of PCT/JP2008/053325, filed Feb. 26, 2008, which is based upon and claims priority from Japanese Patent Application No. 2007-045177 filed Feb. 26, 2007.

TECHNICAL FIELD

The present invention relates to a communication network system and, more particularly, to a QoS (Quality of Service) degradation point estimation method, a QoS degradation point estimation device, and a QoS degradation point estimation program for estimating a QoS degradation point.

BACKGROUND ART

To quickly specify a point of QoS degradation in a communication network at the time of QoS degradation, a number of monitoring devices are arranged in the network to always monitor the QoS in their places. When QoS degradation has occurred, the section of the QoS degradation is estimated based on the position of the monitoring device where the QoS degradation has occurred (e.g., Japanese Patent Laid-Open No. 2002-271392). This method requires a number of monitoring devices to accurately estimate the QoS degradation point, and the arrangement cost is high. To solve this problem, a method has been proposed which estimates a QoS degradation point based on the QoS information and routing information of each communication flow that passes through a network (e.g., Japanese Patent Laid-Open No. 2006-238052).

The QoS degradation point estimation method disclosed in Japanese Patent Laid-Open No. 2006-238052 will be described. First, a table (to be referred to as a flow link table hereinafter) is created, which associates a flow, links (directed links) the flow passes through, and QoS with each other. Assume that flows F1 to F5 go through a network including routers (or packet switches) R1 to R6 shown in FIG. 15. In the network illustrated in FIG. 15, each link is named as shown in FIG. 16. A packet loss rate is used to express QoS. The packet loss rates of the flows F1 to F5 are assumed to be 3.0%, 2.5%, 3.5%, 1.0%, and 0.5%, respectively. In this case, a flow link table shown in FIG. 17 is created. Assume that each flow transmits 100 packets per second, and the packet loss rate is calculated based on the number of lost packets for every 0.2 sec. A bit "1" in FIG. 17 indicates that a flow passes through a link.

The QoS degradation point estimation method next performs non-degraded link removal processing. More specifically, based on predetermined degradation threshold and non-degradation threshold of flow quality, each flow with quality poorer than the degradation threshold is defined as a degraded flow. Each flow with quality higher than the non-degradation threshold is defined as a non-degraded flow. The remaining flows are defined as intermediate quality flows. A reduced flow link table is created by removing, from the flow link table, the rows of the intermediate quality flows, the rows of the non-degraded flows, and the columns of links the non-degraded flows pass through.

For example, the degradation threshold is set to 2% in terms of the packet loss rate, and the non-degradation threshold to 1%. In the example shown in FIG. 17, F1 to F3 are degraded flows, F5 is a non-degraded flow, and F4 is an intermediate quality flow. The row of the intermediate quality flow F4, the row of the non-degraded flow F5, and the columns of links L30 and L45 the non-degraded flow F5 passes through are deleted from the flow link table shown in FIG. 17, as shown in FIG. 18, thereby creating a reduced flow link table shown in FIG. 19.

Finally, the QoS degradation point estimation method estimates a QoS degradation point based on the reduced flow link table in FIG. 19. In, e.g., an estimation method based on the number of QoS degradation flows, the numbers of degraded flows which pass through links L10, L20, L50, and L40 in FIG. 19 are 1, 3, 1, and 1, respectively. Hence, the link L20 through which a maximum number of flows pass is estimated as a QoS degradation point.

In a minimum link count estimation method, a set of flows that pass through the links L10, L20, L50, and L40 in FIG. 19 is considered. A set of a minimum number of links, which covers all flows in FIG. 19, is obtained as a degraded link set. More specifically, in the example shown in FIG. 19, the sets of flows passing through the links L10, L20, L50, and L40 are {F1}, {F1,F2,F3}, {F2}, and {F3}, respectively. A union of flows passing through, e.g., a link set {L10, L50, L40} including three links is {F1,F2,F3} which covers all flows. A link set {L10, L20} including two links or a link set {L20} including one link can also cover all flows. Of the link sets that cover all flows, {L20} including a minimum number of links is estimated as a minimum link set.

DISCLOSURE OF INVENTION

Problems to be Solved by the Invention

The QoS degradation point estimation method disclosed in Japanese Patent Laid-Open No. 2006-238052 estimates a QoS degradation point using all flows going through the network or flows selected from all flows at random. When using all flows going through the network for QoS degradation point estimation, the number of rows (number of flows) of the flow link table is enormous, resulting in time-consuming QoS degradation point estimation. Using flows selected from all flows at random for QoS degradation point estimation makes QoS degradation point estimation inaccurate.

It is an object of the present invention to shorten the time required for QoS degradation point estimation and improve the QoS degradation point estimation accuracy.

Means of Solution to the Problems

A QoS degradation point estimation method according to the present invention comprises the steps of before generating a flow link table which associates QoS of a flow going through a network with a link the flow passes through, preferentially selecting a flow which passes through almost ½ of the total number of links of the network as a flow to be registered in the flow link table, generating the flow link table based on the QoS of the flow going through the network and path information of the network, and estimating a QoS degradation link as a QoS degradation point on the network based on the flow link table.

A QoS degradation point estimation method according to the present invention comprises the steps of before generating a flow link table which associates QoS of a flow going through a network with a link the flow passes through, preferentially selecting a flow which passes through a large number of links as a flow to be registered in the flow link table, generating the flow link table based on the QoS of the flow going through the network and path information of the network, and estimating a QoS degradation link as a QoS degradation point on the network based on the flow link table.

A QoS degradation point estimation method according to the present invention comprises the steps of before generating a flow link table which associates QoS of a flow going through a network with a link the flow passes through, preferentially selecting, out of a set of all flows transmissible/receivable between two arbitrary terminals on the network, a flow pair including two flows whose number of incoincidences of links to pass is almost ½ of the total number of links of the network as flows to be registered in the flow link table, generating the flow link table based on the QoS of the flow going through the network and path information of the network, and estimating a QoS degradation link as a QoS degradation point on the network based on the flow link table.

A QoS degradation point estimation method according to the present invention comprises the steps of before generating a flow link table which associates QoS of a flow going through a network with a link the flow passes through, preferentially selecting, as a flow to be registered in the flow link table, a flow out of a set of all flows transmissible/receivable between two arbitrary terminals on the network so as to make a set of links through which at least one of the flows of the set passes larger, generating the flow link table based on the QoS of the flow going through the network and path information of the network, and estimating a QoS degradation link as a QoS degradation point on the network based on the flow link table.

A QoS degradation point estimation device according to the present invention comprises flow set decision means for, before generating a flow link table which associates QoS of a flow going through a network with a link the flow passes through, preferentially selecting a flow which passes through almost ½ of the total number of links of the network as a flow to be registered in the flow link table, flow quality information collection means for collecting information of the QoS of the flow going through the network, path information collection means for collecting path information of the network, flow link table generation means for generating the flow link table based on the collected information of the QoS and the path information, and estimation means for estimating a QoS degradation link as a QoS degradation point on the network based on the flow link table.

A QoS degradation point estimation device according to the present invention comprises flow set decision means for, before generating a flow link table which associates QoS of a flow going through a network with a link the flow passes through, preferentially selecting a flow which passes through a large number of links as a flow to be registered in the flow link table, flow quality information collection means for collecting information of the QoS of the flow going through the network, path information collection means for collecting path information of the network, flow link table generation means for generating the flow link table based on the collected information of the QoS and the path information, and estimation means for estimating a QoS degradation link as a QoS degradation point on the network based on the flow link table.

A QoS degradation point estimation device according to the present invention comprises flow set decision means for, before generating a flow link table which associates QoS of a flow going through a network with a link the flow passes through, preferentially selecting, out of a set of all flows transmissible/receivable between two arbitrary terminals on the network, a flow pair including two flows whose number of incoincidences of links to pass is almost ½ of the total number of links of the network as flows to be registered in the flow link table, flow quality information collection means for collecting information of the QoS of the flow going through the network, path information collection means for collecting path information of the network, flow link table generation means for generating the flow link table based on the collected information of the QoS and the path information, and estimation means for estimating a QoS degradation link as a QoS degradation point on the network based on the flow link table.

A QoS degradation point estimation device according to the present invention comprises flow set decision means for, before generating a flow link table which associates QoS of a flow going through a network with a link the flow passes through, preferentially selecting, as a flow to be registered in the flow link table, a flow out of a set of all flows transmissible/receivable between two arbitrary terminals on the network so as to make a set of links through which at least one of the flows of the set passes larger, flow quality information collection means for collecting information of the QoS of the flow going through the network, path information collection means for collecting path information of the network, flow link table generation means for generating the flow link table based on the collected information of the QoS and the path information, and estimation means for estimating a QoS degradation link as a QoS degradation point on the network based on the flow link table.

Effects of the Invention

According to the present invention, a flow which passes through almost ½ of the total number of links of the network is preferentially selected as a flow to be registered in the flow link table. This reduces the number of rows (number of flows) of the flow link table. It is therefore possible to make the time required for QoS degradation point estimation shorter than before. It is also possible to minimize the number of links having the same vertical bit strings on the flow link table. This improves the QoS degradation point estimation accuracy.

According to the present invention, a flow which passes through a large number of links is preferentially selected as a flow to be registered in the flow link table. This reduces the number of rows (number of flows) of the flow link table. It is therefore possible to make the time required for QoS degradation point estimation shorter than before. It is also possible to minimize the number of links having the same vertical bit strings on the flow link table. This improves the QoS degradation point estimation accuracy.

According to the present invention, out of the set of all flows transmissible/receivable between two arbitrary terminals on the network, a flow pair including two flows whose number of incoincidences of links to pass is almost ½ of the total number of links of the network is preferentially selected as flows to be registered in the flow link table. This reduces the number of rows (number of flows) of the flow link table. It is therefore possible to make the time required for QoS degradation point estimation shorter than before. It is also possible to minimize the number of links having the same vertical bit strings on the flow link table. This improves the QoS degradation point estimation accuracy.

According to the present invention, out of the set of all flows transmissible/receivable between two arbitrary terminals on the network, a flow is selected as a flow to be registered in the flow link table so as to make the set of links through which at least one of the flows of the set passes larger. This reduces the number of rows (number of flows) of the flow link table. It is therefore possible to make the time required for QoS degradation point estimation shorter than before. It is also possible to minimize the number of links having the same vertical bit strings on the flow link table. This improves the QoS degradation point estimation accuracy.

In the present invention, a flow selected as a flow to be registered in the flow link table is decided as a test flow. When a terminal on the network is instructed to send the test flow to the network, the test flow passes through the terminals. Each terminal transmits the QoS information of the test flow to the QoS degradation point estimation device. As a result, a flow link table concerning flows currently being communicated, including the test flows, is created. In the present invention, an optimum set of test flows to be made to flow independently of communication of a network user can be decided for QoS degradation point estimation. According to the present invention, since it is possible to decide an optimum set of test flows, an optimum method of arranging terminals to pass the test flows on the network can also be decided.

BRIEF DESCRIPTION OF DRAWINGS

FIG. 15 is a view showing an example of the arrangement of a network and an example of flows going through the network associated with the present invention;

FIG. 16 is a view showing links of the network in FIG. 15;

FIG. 17 is a view showing an example of a flow link table;

FIG. 18 is a view showing non-degraded link removal processing of deleting, from the flow link table in FIG. 17, the rows of intermediate quality flows, the rows of non-degraded flows, and the columns of links the non-degraded flows pass through; and FIG. 19 is a view showing an example of a reduced flow link table.

BEST MODE FOR CARRYING OUT THE INVENTION

First Exemplary Embodiment

Figure 1:
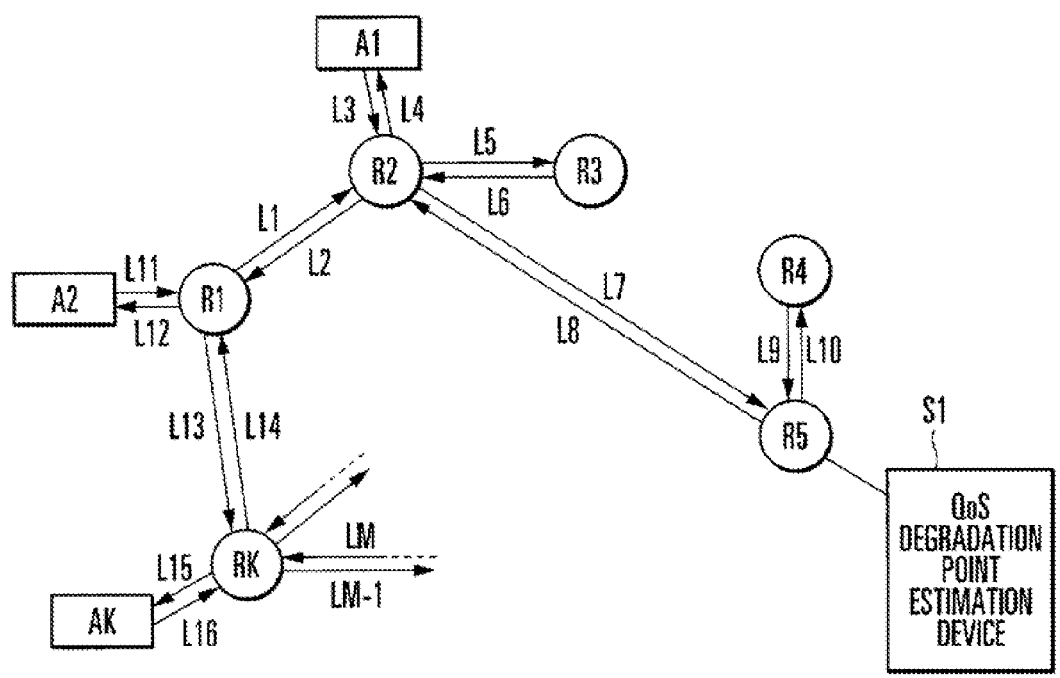
FIG. 1 is a view showing an example of the arrangement of a network according to the first exemplary embodiment of the present invention.

The first exemplary embodiment of the present invention will now be described with reference to the accompanying drawings. FIG. 1 is a view showing an example of the arrangement of a network according to the first exemplary embodiment of the present invention. The network includes routers (or switches) R1 to RN. Test terminals A1 to AK for measuring quality and a QoS (Quality of Service) degradation point estimation device S1 are connected. In this exemplary embodiment, communication links among the routers R1 to RN are represented by L1 to LM, regarding opposite links between two routers as different links.

The test terminals A1 to AK have a function of measuring QoS, a function of notifying the QoS degradation point estimation device S1 of the information of the measured QoS, and a function of generating a test flow and sending it to the network in accordance with an instruction from the QoS degradation point estimation device S1.

Figure 2:
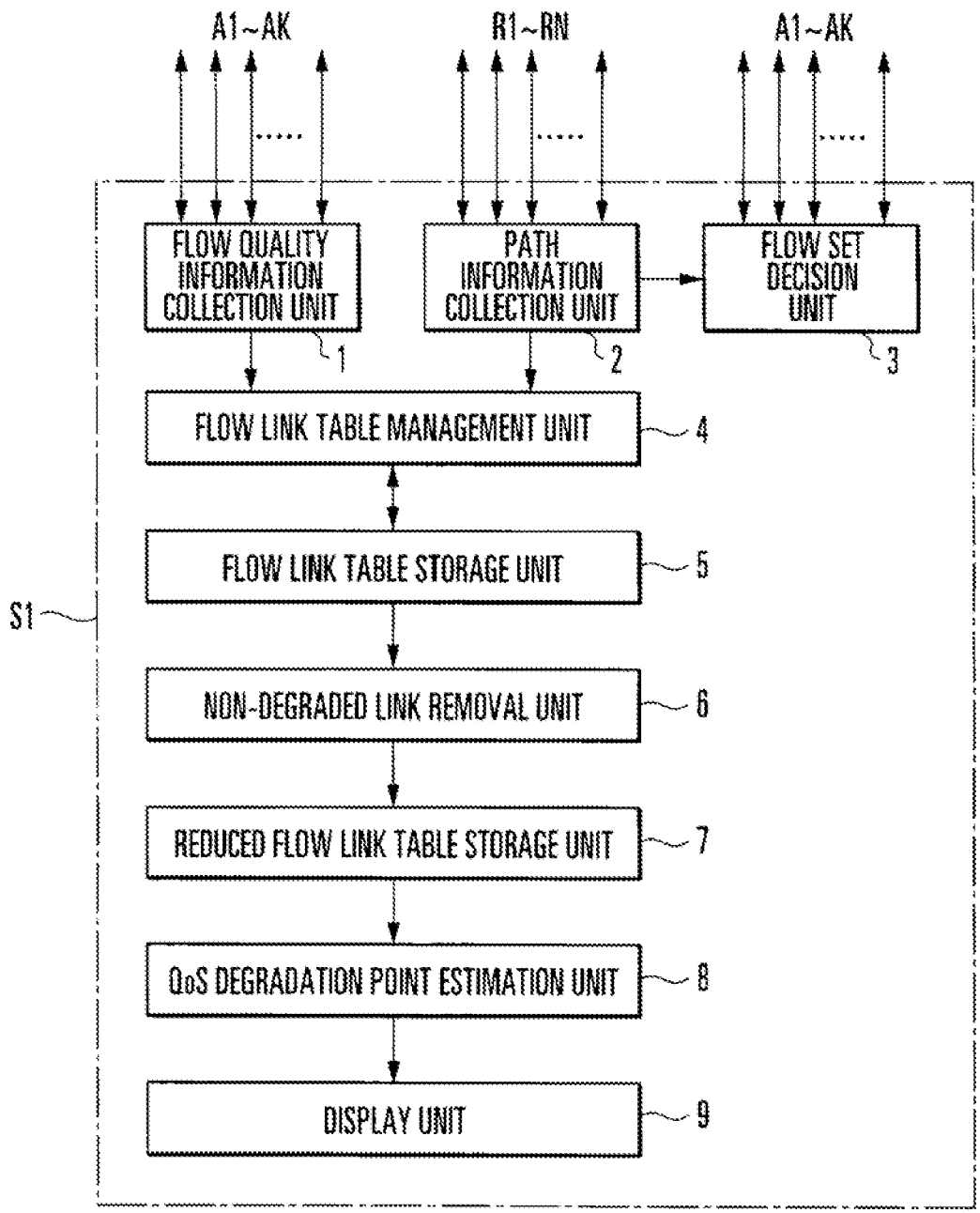
FIG. 2 is a block diagram showing the internal arrangement of a QoS degradation point estimation device according to the first exemplary embodiment of the present invention.

FIG. 2 shows the internal arrangement of the QoS degradation point estimation device S1 according to the first exemplary embodiment of the present invention. The QoS degradation point estimation device S1 includes a flow quality information collection unit 1, a path information collection unit 2, a flow set decision unit 3, a flow link table management unit 4 serving as a flow link table generation means, a flow link table storage unit 5, a non-degraded link removal unit 6, a reduced flow link table storage unit 7, a QoS degradation point estimation unit 8, and a display unit 9. The QoS degradation point estimation device S1 collects QoS information of each flow from the test terminals A1 to AK, estimates a QoS degradation point based on path information acquired from the routers R1 to RN, and outputs the estimation result to the display unit 9.

The operation of each constituent element of the QoS degradation point estimation device S1 will be explained below. When the test terminals A1 to AK start communication, the flow quality information collection unit 1 receives communication start notifications from them. After the start of communication, the flow quality information collection unit 1 periodically receives current QoS information (e.g., the address of a transmission terminal serving as a flow transmission source, the address of a reception terminal serving as a flow destination, flow quality information, and flow rate) from the test terminals A1 to AK. Flow quality information is information about QoS such as a packet loss rate, delay, and delay jitter. A flow rate is information of the number of packets per sec in a flow used for communication. When the test terminals A1 to AK finish the communication, the flow quality information collection unit 1 receives communication end notifications from them.

The path information collection unit 2 collects path information about routing from the routers (switches) R1 to RN. This information collection can be done using SMTP (Simple Network Management Protocol) or the like. Path information allows to decide, based on the address information of transmission and reception terminals, the path to be used for communication between them. Path information collected from a router more particularly includes the configuration information of a routing table and an ARP (Address Resolution Protocol) table. Path information collected from a switch more specifically includes the configuration information of a forwarding database and a spanning tree. Note that a network administrator may give the path information, instead of collecting it from the routers (switches) R1 to RN.

Figures 3, 4:
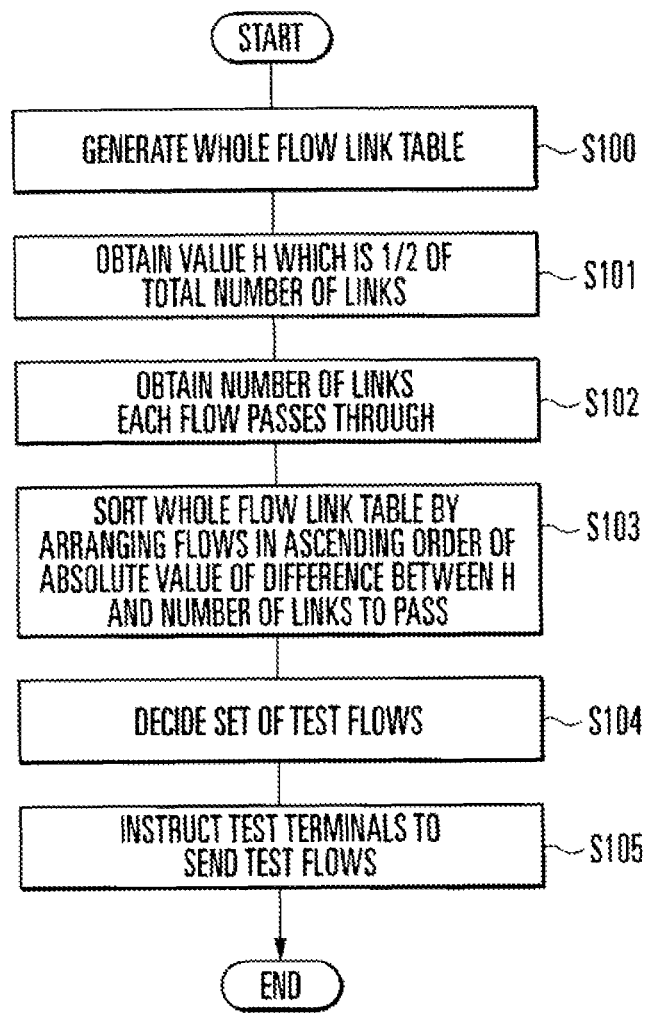
FIG. 3 is a flowchart illustrating the operation of a flow set decision unit in the QoS degradation point estimation device according to the first exemplary embodiment of the present invention.
FIG. 4 is a view showing an example of a whole flow link table according to the first exemplary embodiment of the present invention.

The flow set decision unit 3 acquires, from the test terminals A1 to AK, information representing routers connected to them. Based on this information and the path information collected by the path information collection unit 2, the flow Set decision unit 3 decides terminals to pass a test flow in a way to be described below and instructs the test terminals A1 to AK to pass the test flow through the decided terminals. FIG. 3 is a flowchart illustrating the operation of the flow set decision unit 3.

First, the flow set decision unit 3 generates a flow link table concerning all flows between arbitrary two of the K test terminals A1 to AK by associating a flow, links the flow passes through, the address of a transmission terminal serving as a flow transmission source, and the address of a reception terminal serving as a flow destination with each other (step S100 in FIG. 3). This flow link table will be referred to as a whole flow link table X. Distinguishing the flow transmission and reception directions, there can exist K×(K−1) flows between arbitrary two of the K test terminals A1 to AK. Hence, the whole flow link table X is generated for K×(K−1) flows.

FIG. 4 shows an example of the whole flow link table X. F1 in FIG. 4 represents a flow. In the example shown in FIG. 4, all cells are blank. In the actual whole flow link table X, a bit "1" is set in a cell at the intersection between the row of a flow and the column of a link the flow passes through.

The whole flow link table X can be generated using the information acquired from the test terminals A1 to AK and representing routers of their connection destinations and the path information collected by the path information collection unit 2. The flow set decision unit 3 decides a set of test flows to be supplied for QoS measurement from the K×(K−1) flows in the whole flow link table X in the following way.

In this exemplary embodiment, a first flow set decision method is used as the flow set decision method. Using the first flow set decision method, the flow set decision unit 3 first calculates a value H that is ½ of the total number M of links (step S101). If the total number M of links is not exactly divisible by 2, M/2 is rounded into the integer value H by rounding up or dropping fractions below the decimal point of M/2.

Next, the flow set decision unit 3 obtains, from the whole flow link table X, the number of links each flow passes through (step S102). The number of links to pass is obtained by counting bits "1" in each row of the whole flow link table X. The flow set decision unit 3 sorts the rows of the whole flow link table X by arranging the flows in ascending order of the absolute value of the difference between H and the number of links to pass (step S103). If a plurality of flows pass through the same number of links, i.e., if a plurality of flows are identical in the absolute value of the difference between H and the number of links to pass, these flows can be sorted in any order.

The flow set decision unit 3 decides, as a set of test flows, a predetermined number J of flows in the sorted whole flow link table X in descending order of priority order, i.e., in ascending order of the absolute value of the difference between H and the number of links to pass (step S104). Alternatively, the flow set decision unit 3 decides, as a set of test flows, flows whose absolute value between H and the number of links to pass is equal to or smaller than a predetermined threshold in the sorted whole flow link table X (step S104).

Finally, the flow set decision unit 3 instructs, out of the test terminals A1 to AK, the transmission and reception terminals of the decided test flows to send them (step S105).

Based on the QoS information collected by the flow quality information collection unit 1 and the path information collected by the path information collection unit 2, the flow link table management unit 4 generates a flow link table concerning flows currently being communicated by associating the transmission terminal addresses, the reception terminal addresses, links to pass, flow qualities (e.g., packet loss rates), and flow rates. The flow link table storage unit 5 stores the flow link table.

Figures 5, 6:
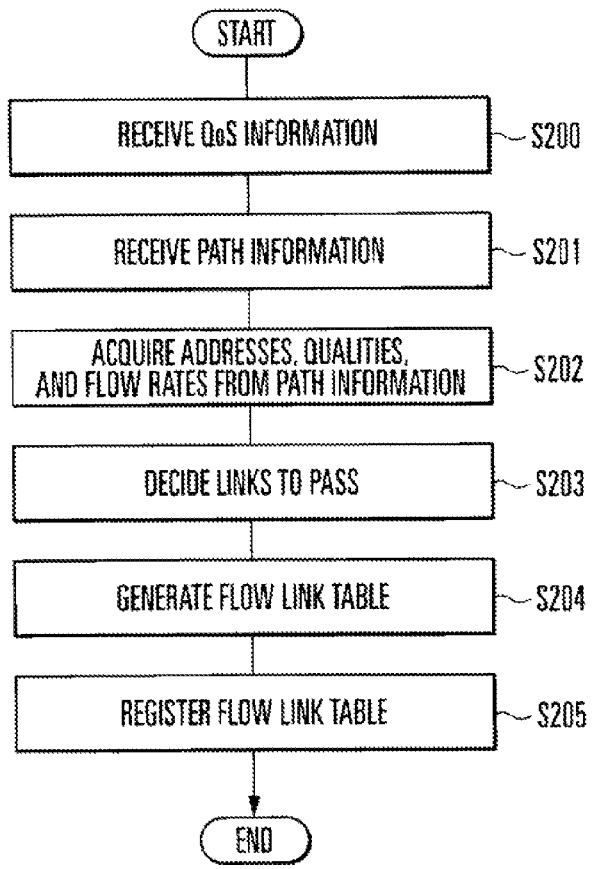
FIG. 5 is a flowchart illustrating the operation of a flow link table management unit in the QoS degradation point estimation device according to the first exemplary embodiment of the present invention.
FIG. 6 is a view showing an example of a flow link table according to the first exemplary embodiment of the present invention.

This flow link table will be referred to as a flow link table Y. FIG. 5 is a flowchart illustrating the operation of the flow link table management unit 4.

The flow link table management unit 4 receives QoS information from the flow quality information collection unit 1 (step S200 in FIG. 5) and path information from the path information collection unit 2 (step S201). The flow link table management unit 4 then acquires transmission terminal addresses, reception terminal addresses, flow qualities, and flow rates from the QoS information (step S202). Links each flow will pass through are decided based on the path information and the transmission terminal address (step S203). The flow link table management unit 4 thus generates the flow link table Y (step S204) and registers it in the flow link table storage unit 5 (step S205).

FIG. 6 shows an example of the flow link table Y. A bit "1" is set in a cell at the intersection between the row of a flow and the column of a link the flow passes through, like the whole flow link table X.

With the above-described operation of the flow set decision unit 3, the test flows go through the test terminals A1 to AK. The test terminals A1 to AK transmit the QoS information of the test flows to the QoS degradation point estimation device S1. Hence, the flow link table Y is created concerning flows currently being communicated, including the test flows.

Figure 7:
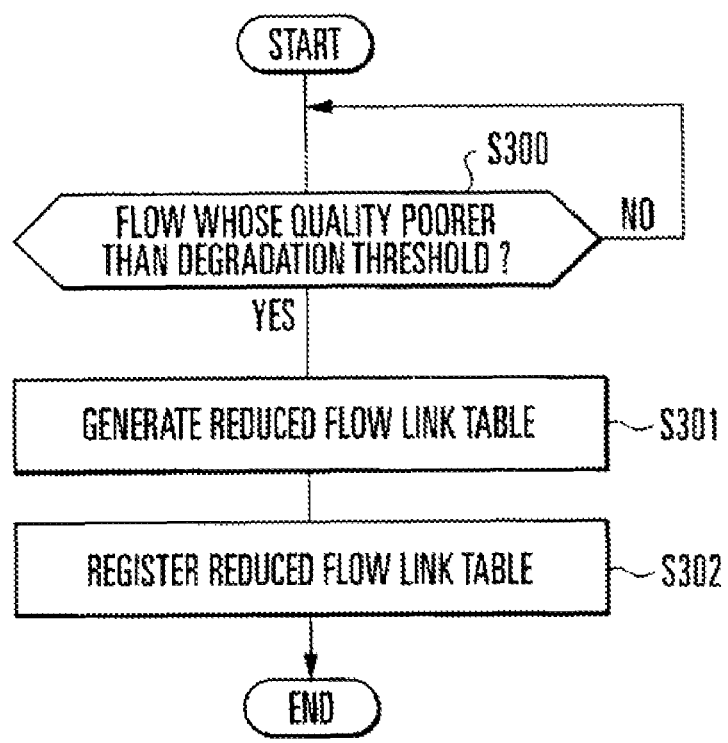
FIG. 7 is a flowchart illustrating the operation of a non-degraded link removal unit in the QoS degradation point estimation device according to the first exemplary embodiment of the present invention.

The non-degraded link removal unit 6 periodically performs non-degraded link removal processing for the flow link table Y, thereby generating a reduced flow link table Z. The reduced flow link table storage unit 7 stores the reduced flow link table Z. FIG. 7 is a flowchart illustrating the operation of the non-degraded link removal unit 6.

Figure 8:
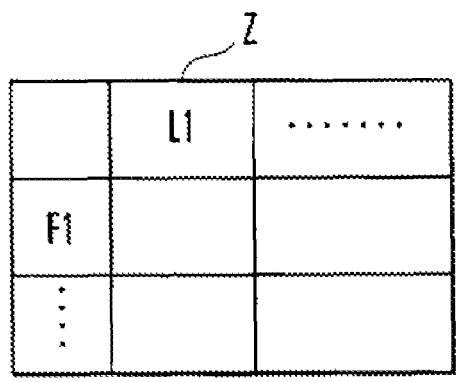
FIG. 8 is a view showing an example of a reduced flow link table according to the first exemplary embodiment of the present invention.

The non-degraded link removal unit 6 periodically reads out the flow link table Y from the flow link table storage unit 5 and checks whether a degraded flow having quality poorer than a predetermined degradation threshold exists (step S300 in FIG. 7). If a degraded flow exists, the non-degraded link removal unit 6 deletes, from the flow link table Y, the rows of non-degraded flows except the degraded flow and the columns of links the non-degraded flows pass through, and also the transmission terminal addresses, the reception terminal addresses, the flow qualities, and the flow rates. The non-degraded link removal unit 6 thus generates the reduced flow link table Z (step S301) and registers it in the reduced flow link table storage unit 7 (step S302). FIG. 8 shows an example of the reduced flow link table Z.

Figures 9, 10, 11:
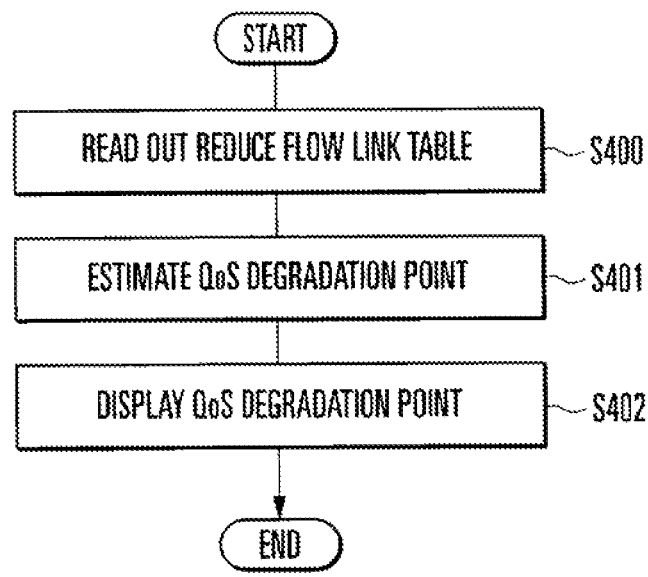
FIG. 9 is a flowchart illustrating the operation of a QoS degradation point estimation unit in the QoS degradation point estimation device according to the first exemplary embodiment of the present invention.
FIG. 10 is a view showing an example of a flow link table so as to explain the effects of the first exemplary embodiment of the present invention.
FIG. 11 is a view showing an example of a reduced flow link table so as to explain the effects of the first exemplary embodiment of the present invention.

FIG. 9 is a flowchart illustrating the operation of the QoS degradation point estimation unit 8. The QoS degradation point estimation unit 8 reads out the reduced flow link table Z from the reduced flow link table storage unit 7 (step S400), estimates a QoS degradation point using a QoS degradation flow count estimation method or a minimum link count estimation method (step S401), and displays the estimated QoS degradation point on the display unit 9 (step S402).

As described with reference to FIG. 19, the QoS degradation flow count estimation method estimates, as a QoS degradation point, a link through which a maximum number of degraded flows pass out of the links registered in the reduced flow link table Z.

On the other hand, the minimum link count estimation method estimates, as a QoS degradation point, a minimum link set including a minimum number of links out of the link sets (combinations of links) which are registered in the reduced flow link table Z and cover all degraded flows.

The QoS degradation point estimation device S1 thus causes the display unit 9 to display the link estimated as the QoS degradation point.

The effects of this exemplary embodiment will be explained next. In the QoS degradation point estimation method disclosed in Japanese Patent Laid-Open No. 2006-238052, if the vertical bit strings set in the columns of links of the flow link table Y include one or more links having the same bit string, all these links are regarded as candidates for the QoS degradation point independently of which link has actual QoS degradation. Assume the flow link table Y shown in FIG. 10. In the flow link table Y, the links L2 and L4 have the same bit string. Hence, the reduced flow link table Z shown in FIG. 11 is generated even if only one of them has QoS degradation. In this case, the QoS degradation point estimation unit 8 determines both the links L2 and L4 as QoS degradation points using either the estimation method based on the number of QoS degradation flows or the minimum link count estimation method. As a result, one of the links without QoS degradation is erroneously determined as a QoS degradation point, resulting in a poorer estimation accuracy.

However, the flow set decision unit 3 of this exemplary embodiment selects a set of test flows so as to minimize the number of links having the same bit strings for a minimum number of flows. In the first flow set decision method of this exemplary embodiment, a flow whose number of bits (number of links to pass) set in a corresponding row of the whole flow link table X is almost ½ of the total number of links is preferentially decided as a test flow.

The reason why the first flow set decision method is used is as follows. Place focus on two rows (flows) of the whole flow link table X. If each row includes bits "1" at random, the number of rows including ½ bits "1" can be maximized. In addition, the average value of the probabilities that the bits of the two rows of interest are located at different positions is maximized. This phenomenon occurs as can be seen from the following. Let p is the probability that each column of the whole flow link table X has a bit "1". When two rows include an equal number of bits "1", the probability that the bits are different is given by $p \times (1-p)$. This probability is maximized when $p=½$.

According to the test flow set thus decided by the flow set decision unit 3, the number of rows (number of flows) of the flow link table Y can be reduced. It is therefore possible to shorten the time required for QoS degradation point estimation as compared to the QoS degradation point estimation method disclosed in Japanese Patent Laid-Open No. 2006-238052. It is also possible to minimize the number of links having the same vertical bit strings on the flow link table Y. This improves the QoS degradation point estimation accuracy.

Second Exemplary Embodiment

The second exemplary embodiment of the present invention will be described next. The arrangement of a network and a QoS degradation point estimation device S1 according to this exemplary embodiment is the same as in the first exemplary embodiment and will be explained using the reference numerals in FIGS. 1 and 2.

Unlike the first exemplary embodiment, a flow set decision unit 3 uses a second flow set decision method as a flow set decision method. The second flow set decision method will be described below.

Figure 12:
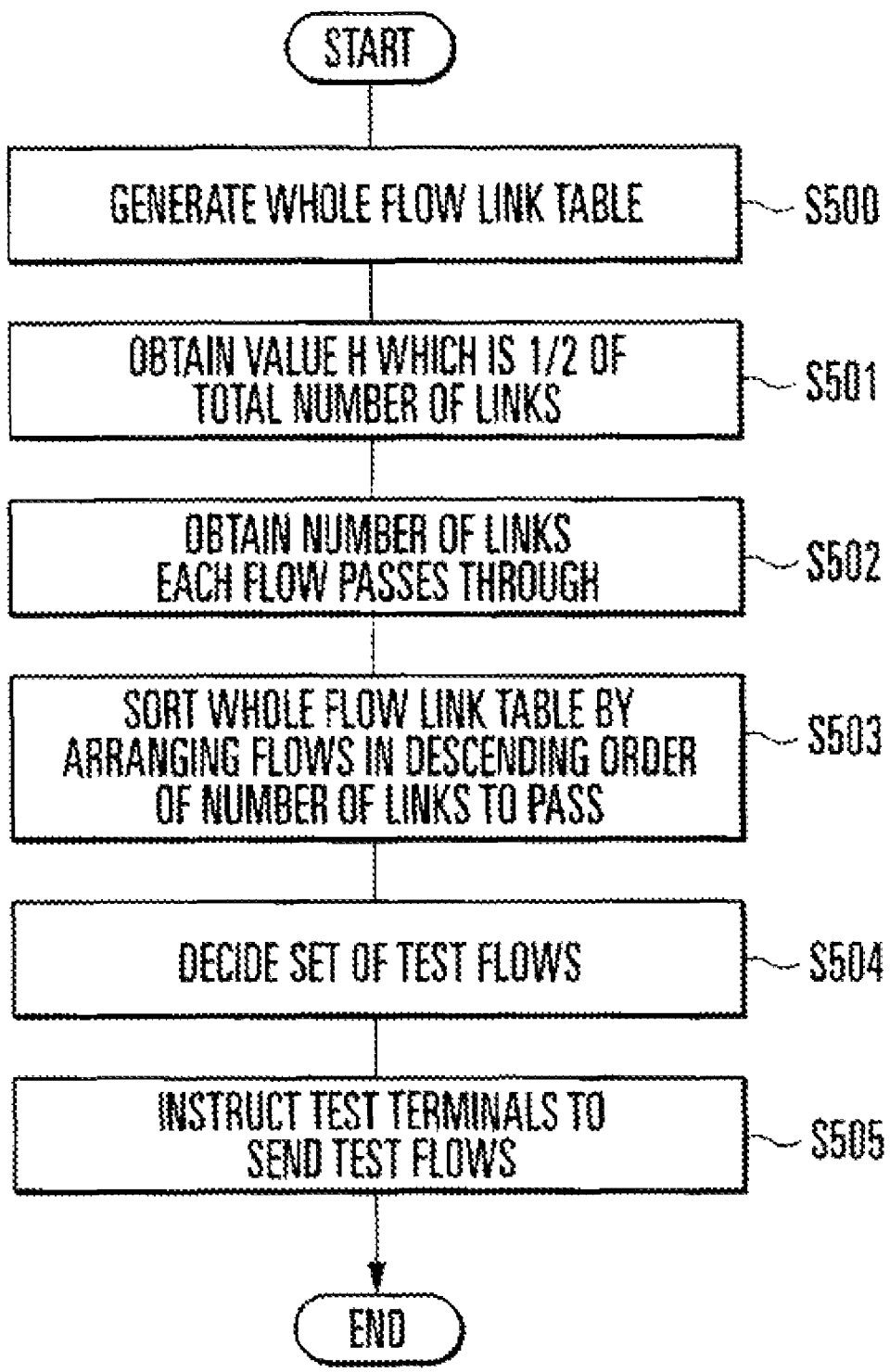
FIG. 12 is a flowchart illustrating the operation of a flow set decision unit in a QoS degradation point estimation device according to the second exemplary embodiment of the present invention.

FIG. 12 is a flowchart illustrating the operation of the flow set decision unit 3 according to this exemplary embodiment. First, the flow set decision unit 3 of this exemplary embodiment generates a whole flow link table X as in step S100 (step S500), calculates a value H that is ½ of the total number M of links as in step S101 (step S501), and obtains, from the whole flow link table X, the number of links each flow passes through as in, step S102 (step S502).

The flow set decision unit 3 then sorts the rows of the whole flow link table X by arranging the flows in descending order of the number of links to pass (step S503). If a plurality of flows pass through the same number of links, these flows can be sorted in any order.

The flow set decision unit 3 decides, as a set of test flows, a predetermined number J of flows in the sorted whole flow link table X in descending order of priority order, i.e., in ascending order of the number of links to pass (step S504). Alternatively, the flow set decision unit 3 decides, as a set of test flows, flows which pass through links in number equal to or larger than a predetermined threshold in the sorted whole flow link table X (step S504).

Finally, the flow set decision unit 3 instructs, out of test terminals A1 to AK, the transmission and reception terminals of the decided test flows to send them (step S505). The processing of the flow set decision unit 3 thus ends.

The operations of the remaining constituent elements of the QoS degradation point estimation device S1 are the same as in the first exemplary embodiment.

The second flow set decision method of the flow set decision unit 3 according to this exemplary embodiment is based on the same concept as that of the first flow set decision method. Considering network topology in general, a flow can pass only links much fewer than ½ of the total number M of links of the network at a high probability. Passing through almost ½ of the total number M of links is realistically synonymous with passing through links as many as possible. Hence, the second flow set decision method of this exemplary embodiment enables to obtain the same effects as those of the first flow set decision method.

Third Exemplary Embodiment

The third exemplary embodiment of the present invention will be described next. The arrangement of a network and a QoS degradation point estimation device S1 according to this exemplary embodiment is the same as in the first exemplary embodiment and will be explained using the reference numerals in FIGS. 1 and 2.

Unlike the first exemplary embodiment, a flow set decision unit 3 uses a third flow set decision method as a flow set decision method. The third flow set decision method will be described below.

Figure 13:
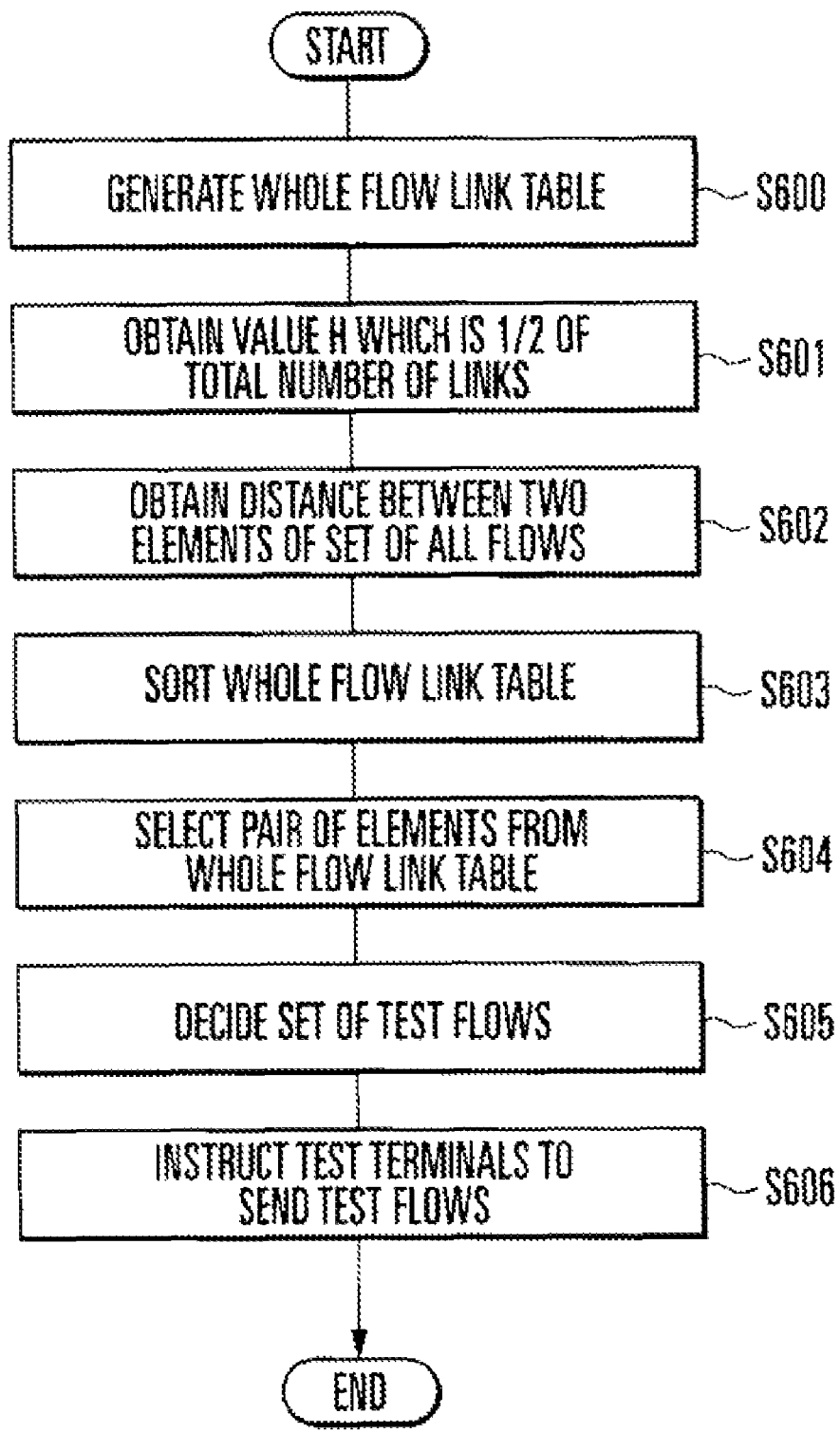
FIG. 13 is a flowchart illustrating the operation of a flow set decision unit in a QoS degradation point estimation device according to the third exemplary embodiment of the present invention.

FIG. 13 is a flowchart illustrating the operation of the flow set decision unit 3 according to this exemplary embodiment. First, the flow set decision unit 3 of this exemplary embodiment generates a whole flow link table X as in step S100 (step S600) and calculates a value H that is ½ of the total number M of links as in step S101 (step S601). Then, the flow set decision unit 3 defines a set U of all flows (rows) of the whole flow link table X and calculates the distance between two elements of the set U, assuming all possible combinations of elements (step S602).

As the distance between two elements of the set U, the Hamming distance between bit strings representing links to pass, i.e., the number of incoincidences of links to pass between two elements is used. Assume that a flow F1 passes through links L1 and L3, and a flow F2 passes through the link L1 in the whole flow link table X. The link to pass having a bit incoincidence between the flows F1 and F2, i.e., two elements of the set U is L3. Hence, the distance between the flows F1 and F2 is 1. Note that there are a total of K×(K−1)×{K×(K−1)−1} possible combinations of two elements of the set U. A set of elements whose inter-element distance is obtained in step S602 will be referred to as a pair hereinafter.

Next, the flow set decision unit 3 calculates the absolute value of the difference between H and the inter-element distance for all pairs whose inter-element distances are obtained in step S602. The flow set decision unit 3 then sorts the rows of the whole flow link table X by arranging the pairs in ascending order of the absolute value of the difference between H and the inter-element distance (step S603).

The flow set decision unit 3 selects a predetermined number P of pairs from the start of the sorted whole flow link table X in descending order of priority order, i.e., in ascending order of the absolute value of the difference between H and the inter-element distance (step S604). Alternatively, the flow set decision unit 3 selects, from the pairs of the sorted whole flow link table X pairs, pairs whose absolute value between H and the inter-element distance is equal to or smaller than a predetermined threshold (step S604).

The flow set decision unit 3 decides, as test flows, all flows included in at least one element of each pair of the pair set selected in step S604 (step S605). Finally, the flow set decision unit 3 instructs, out of test terminals A1 to AK, the transmission and reception terminals of the decided test flows to send them (step S606). The processing of the flow set decision unit 3 thus ends.

The operations of the remaining constituent elements of the QoS degradation point estimation device S1 are the same as in the first exemplary embodiment.

The third flow set decision method of the flow set decision unit 3 according to this exemplary embodiment provides the following effects.

Placing focus on two arbitrary rows of the whole flow link table X, the number of bit incoincidences of links to pass corresponds to the Hamming distance. Between two arbitrary flows, a link can have only four bit combinations (0,0), (0,1), (1,0), and (1,1). All links are classified into four types by the combinations of the manner the qualities of the two flows appear.

When the two arbitrary flows include four links with bit combinations (0,0), (0,1), (1,0), and (1,1), the Hamming distance concerning the four links is 2. This is extended to all links. When the Hamming distance is ½ of the total number of links, all links are most uniformly identified as the four types. If the number of flows is k, the number of links identifiable by the k flows is maximized (i.e., the number of links having the same vertical bit strings can be minimized) when all flows uniformly identify the four types.

Such a flow set enables to maximize the QoS degradation point estimation accuracy using a minimum number of flows.

As described above, in this exemplary embodiment, flows that make the Hamming distance between them closer to ½ of the total number of links are selected. Hence, the QoS degradation point estimation accuracy can be expected to be maximized using a minimum number of flows.

Fourth Exemplary Embodiment

The fourth exemplary embodiment of the present invention will be described next. The arrangement of a network and a QoS degradation point estimation device S1 according to this exemplary embodiment is the same as in the first exemplary embodiment and will be explained using the reference numerals in FIGS. 1 and 2.

Unlike the first exemplary embodiment, a flow set decision unit 3 uses a fourth flow set decision method as a flow set decision method. The fourth flow set decision method will be described below.

Figure 14:
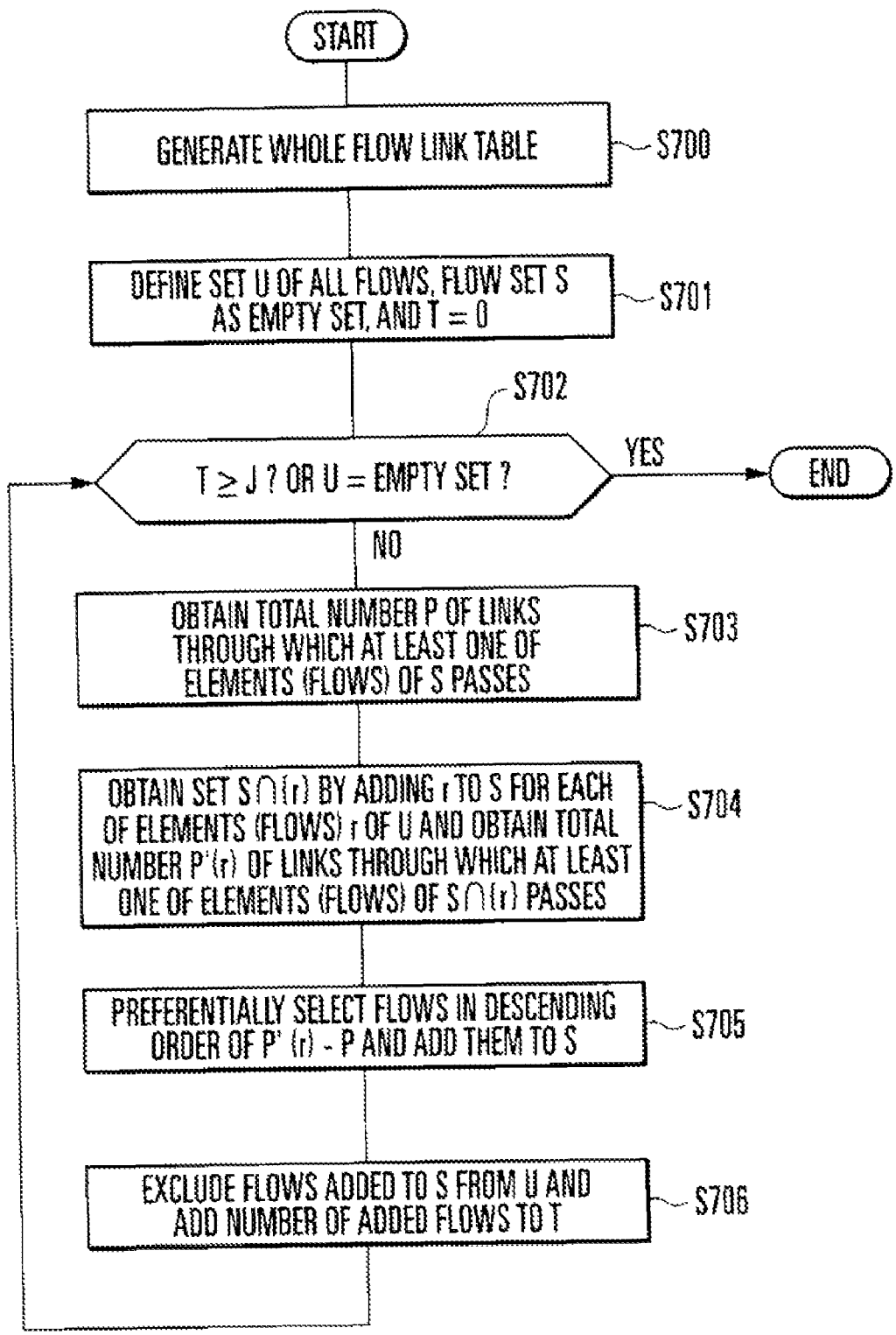
FIG. 14 is a flowchart illustrating the operation of a flow set decision unit in a QoS degradation point estimation device according to the fourth exemplary embodiment of the present invention.

FIG. 14 is a flowchart illustrating the operation of the flow set decision unit 3 according to this exemplary embodiment. First, the flow set decision unit 3 of this exemplary embodiment generates a whole flow link table X as in step S100 (step S700). The flow set decision unit 3 then defines a set U of all flows (rows) of the whole flow link table X, a flow set S as an empty set, and T=0 (step S701).

Next, the flow set decision unit 3 checks whether T is equal to or larger than a predetermined value J, or U is an empty set (step S702). If any one of the conditions is satisfied, the processing in FIG. 14 ends. Otherwise, the process advances to the next step (step S703). Using the whole flow link table X, the flow set decision unit 3 obtains the total number P of links through which at least one of the flows as the elements of S passes (step S703). The flow set decision unit 3 obtains a flow set S∩{r} by adding r to S for each of flows r as the elements of U, and obtains the total number P'(r) of links through which at least one of the flows as the elements of Sω{r} passes (step S704).

The flow set decision unit 3 calculates the difference P'(r)—P between P'(r) for each flow r obtained in step S704 and P obtained in step S703, preferentially selects flows in descending order of the difference, and adds them to S (step S705). The flow set decision unit 3 excludes the flows added to S in step S705 from U, adds the number of added flows to T, and returns to step S702 (step S706). Every time the process in step S705 is performed, T monotonously increases, and the number of elements of U monotonously decreases. At least one of the two conditions in step S702 is certainly satisfied sometime, and the flow set decision unit 3 stops its operation.

The operations of the remaining constituent elements of the QoS degradation point estimation device S1 are the same as in the first exemplary embodiment.

The fourth flow set decision method of the flow set decision unit 3 according to this exemplary embodiment provides the following effects.

Place focus on each column of the whole flow link table X. If degradation occurs in a link no flow passes through, no flow is degraded. Since the occurrence itself of the QoS degradation is missed, the QoS degradation point estimation accuracy lowers. In this exemplary embodiment, when deciding the flow set, flows are selected and added so as to minimize the number of links no flow passes through. It can therefore be expected to minimize the possibility that occurrence of QoS degradation is missed and maximize the QoS degradation point estimation accuracy using a small number of flows.

The QoS degradation point estimation device S1 according to each of the first to fourth exemplary embodiments can be implemented by, e.g., a computer including a CPU, a storage device, and interfaces and a program to control these hardware resources. A QoS degradation point estimation program to operate the computer is provided as a program recorded on a recording medium such as a flexible disk, CD-ROM, DVD-ROM, or memory card. The CPU writes the readout program in the storage device and executes the processing described in the first to fourth exemplary embodiments in accordance with the program.

INDUSTRIAL APPLICABILITY

The present invention is applicable to a technique of estimating a QoS degradation point in a communication network system.

The invention claimed is:

1. A QoS (Quality of Service) degradation point estimation method comprising the steps of:
before generating a flow link table which associates QoS of a flow going through a network with a link the flow passes through, setting H to a value that is ½ of the total number of links in the network, and selecting, in ascending order of an absolute value of a difference between H and the number of links to pass, a predetermined number of flows as flows to be registered in the flow link table or selecting, in ascending order of the absolute value of the difference between H and the number of links to pass, flows having absolute values between H and the number of links to pass that are not more than a predetermined threshold as flows to be registered in the flow link table;
generating the flow link table based on the QoS of the flow going through the network and path information of the network; and
estimating a QoS degradation link as a QoS degradation point on the network based on the flow link table.

2. A QoS degradation point estimation method according to claim 1, wherein the step of selecting the flow comprises the steps of:
setting the selected flow as a test flow; and
instructing a terminal on the network to send the test flow to the network.

3. A QoS degradation point estimation method according to claim 1, wherein the step of estimating the QoS degradation link comprises the steps of:
removing, from the flow link table, rows of non-degraded flows except a degraded flow whose quality is poorer than a predetermined degradation threshold and columns of links the non-degraded flows pass through, thereby generating a reduced flow link table; and
estimating the QoS degradation link based on the reduced flow link table.

4. A QoS degradation point estimation method according to claim 3, wherein in the step of estimating the QoS degradation link based on the reduced flow link table, out of links registered in the reduced flow link table, a link through which a maximum number of QoS degradation flows pass is estimated as the QoS degradation link.

5. A QoS degradation point estimation method according to claim 3, wherein in the step of estimating the QoS degradation link based on the reduced flow link table, out of link sets each covering all QoS degradation flows registered in the reduced flow link table, a minimum link set having a minimum number of links is estimated as the QoS degradation link.

6. A QoS degradation point estimation method comprising the steps of:
before generating a flow link table which associates QoS of a flow going through a network with a link the flow passes through, setting H to a value that is ½ of the total number of links of the network, defining a distance between two flows included in a set of all flows transmissible or receivable between two arbitrary terminals on the network as the number of incoincidences of links to pass between the two flows, calculating the distances for all combinations of flows, and selecting, in ascending order of an absolute value of a difference between H and the distance, a predetermined number of flow pairs as flows to be registered in the flow link table, or selecting, in ascending order of the absolute value of the difference between H and the distance, flow pairs having absolute values of the differences between H and the distances that are not more than a predetermined threshold as flows to be registered in the flow link table;
generating the flow link table based on the QoS of the flow going through the network and path information of the network; and
estimating a QoS degradation link as a QoS degradation point on the network based on the flow link table.

7. A QoS degradation point estimation method according to claim 6, wherein the step of selecting the flow comprises the steps of:
setting the selected flow as a test flow; and
instructing a terminal on the network to send the test flow to the network.

8. A QoS degradation point estimation method according to claim 6, wherein the step of estimating the QoS degradation link comprises the steps of:
removing, from the flow link table, rows of non-degraded flows except a degraded flow whose quality is poorer than a predetermined degradation threshold and columns of links the non-degraded flows pass through, thereby generating a reduced flow link table; and
estimating the QoS degradation link based on the reduced flow link table.

9. A QoS degradation point estimation method according to claim 8, wherein in the step of estimating the QoS degradation link based on the reduced flow link table, out of links registered in the reduced flow link table, a link through which a maximum number of QoS degradation flows pass is estimated as the QoS degradation link.

10. A QoS degradation point estimation method according to claim 8, wherein in the step of estimating the QoS degradation link based on the reduced flow link table, out of link sets each covering all QoS degradation flows registered in the reduced flow link table, a minimum link set having a minimum number of links is estimated as the QoS degradation link.

11. A QoS degradation point estimation method comprising the steps of:
before generating a flow link table which associates QoS of a flow going through a network with a link the flow passes through, setting U to a set of all flows transmissible or receivable between two arbitrary terminals on the network, S to an empty set, and T to 0, repeatedly performing, until T becomes not less than a predetermined value or U becomes an empty set, a process of obtaining the total number P of links through which at least one of the flows serving as elements of S passes, a process of obtaining a flow set S {r} obtained by adding r to S and of obtaining the total number P'(r) of the links through which at least one of the flows as elements of S {r} passes, a process of obtaining a difference P'(r) □ P between P'(r) and P for each flow R and adding to S a flow r having a maximum difference, a process of excluding the flow added to S from U, and a process of adding to T the number of flows added to S, and selecting the flows added to S as flows to be registered in the flow link table;

generating the flow link table based on the QoS of the flow going through the network and path information of the network; and estimating a QoS degradation link as a QoS degradation point on the network based on the flow link table.

12. A QoS degradation point estimation method according to claim 4, wherein the step of selecting the flow comprises the steps of:

setting the selected flow as a test flow; and instructing a terminal on the network to send the test flow to the network.

13. A QoS degradation point estimation method according to claim 11, wherein the step of estimating the QoS degradation link comprises the steps of:

removing, from the flow link table, rows of non-degraded flows except a degraded flow whose quality is poorer than a predetermined degradation threshold and columns of links the non-degraded flows pass through, thereby generating a reduced flow link table; and estimating the QoS degradation link based on the reduced flow link table.

14. A QoS degradation point estimation method according to claim 13, wherein in the step of estimating the QoS degradation link based on the reduced flow link table, out of links registered in the reduced flow link table, a link through which a maximum number of QoS degradation flows pass is estimated as the QoS degradation link.

15. A QoS degradation point estimation method according to claim 13, wherein in the step of estimating the QoS degradation link based on the reduced flow link table, out of link sets each covering all QoS degradation flows registered in the reduced flow link table, a minimum link set having a minimum number of links is estimated as the QoS degradation link.

16. A QoS degradation point estimation device comprising:

hardware;

a flow set decision unit which, before generating a flow link table which associates QoS of a flow going through a network with a link the flow passes through, sets H to a value that is ½ of the total number of links in the network, and selects, in ascending order of an absolute value of a difference between H and the number of links to pass, a predetermined number of flows as flows to be registered in the flow link table or selects, in ascending order of the absolute value of the difference between H and the number of links to pass, flows having absolute values between H and the number of links to pass that are not more than a predetermined threshold as flows to be registered in the flow link table;

a flow quality information collection unit which collects information of the QoS of the flow going through the network;

a path information collection unit which collects path information of the network;

a flow link table generation unit which generates the flow link table based on the collected information of the QoS and the path information; and an estimation unit which estimates a QoS degradation link as a QoS degradation point on the network based on the flow link table, wherein one or more of the flow set decision unit, the flow quality information collection unit, the path information collection unit, the flow link table generation unit, and the estimation unit are each implemented by the hardware.

17. A QoS degradation point estimation device according to claim 16, wherein said flow set decision unit comprises:

a unit which sets the selected flow as a test flow; and a unit which instructs a terminal on the network to send the test flow to the network.

18. A QoS degradation point estimation device according to claim 16, wherein said estimation unit comprises:

a non-degraded link removal unit which removes, from the flow link table, rows of non-degraded flows except a degraded flow whose quality is poorer than a predetermined degradation threshold and columns of links the non-degraded flows pass through, thereby generating a reduced flow link table; and a QoS degradation point estimation unit which estimates the QoS degradation link based on the reduced flow link table.

19. A QoS degradation point estimation device according to claim 18, wherein said QoS degradation point estimation unit estimates, out of links registered in the reduced flow link table, a link through which a maximum number of QoS degradation flows pass as the QoS degradation link.

20. A QoS degradation point estimation device according to claim 18, wherein said QoS degradation point estimation unit estimates, out of link sets each covering all QoS degradation flows registered in the reduced flow link table, a minimum link set having a minimum number of links as the QoS degradation link.

21. A QoS degradation point estimation device comprising:

hardware;

a flow set decision unit which, before generating a flow link table which associates QoS of a flow going through a network with a link the flow passes through, sets H to a value that is ½ of the total number of links of the network, defines a distance between two flows included in a set of all flows transmissible or receivable between two arbitrary terminals on the network as the number of incoincidences of links to pass between the two flows, calculates the distances for all combinations of flows, and selects, in ascending order of an absolute value of a difference between H and the distance, a predetermined number of flow pairs as flows to be registered in the flow link table, or selects, in ascending order of the absolute value of the difference between H and the distance, flow pairs having absolute values of the differences between H and the distances that are not more than a predetermined threshold as flows to be registered in the flow link table;

a flow quality information collection unit which collects information of the QoS of the flow going through the network;

a path information collection unit which collects path information of the network;

a flow link table generation unit which generates the flow link table based on the collected information of the QoS and the path information; and an estimation unit which estimates a QoS degradation link as a QoS degradation point on the network based on the flow link table, wherein one or more of the flow set decision unit, the flow quality information collection unit, the path information collection unit, the flow link table generation unit, and the estimation unit are each implemented by the hardware.

22. A QoS degradation point estimation device according to claim 21, wherein said flow set decision unit comprises:
   a unit which sets the selected flow as a test flow; and
   a unit which instructs a terminal on the network to send the test flow to the network.

23. A QoS degradation point estimation device according to claim 21, wherein said estimation unit comprises:
   a non-degraded link removal unit which removes, from the flow link table, rows of non-degraded flows except a degraded flow whose quality is poorer than a predetermined degradation threshold and columns of links the non-degraded flows pass through, thereby generating a reduced flow link table; and
   a QoS degradation point estimation unit which estimates the QoS degradation link based on the reduced flow link table.

24. A QoS degradation point estimation device according to claim 23, wherein said QoS degradation point estimation unit estimates, out of links registered in the reduced flow link table, a link through which a maximum number of QoS degradation flows pass as the QoS degradation link.

25. A QoS degradation point estimation device according to claim 23, wherein said QoS degradation point estimation unit estimates, out of link sets each covering all QoS degradation flows registered in the reduced flow link table, a minimum link set having a minimum number of links as the QoS degradation link.

26. A QoS degradation point estimation device comprising:
   hardware;
   a flow set decision unit which, before generating a flow link table which associates QoS of a flow going through a network with a link the flow passes through, sets U to a set of all flows transmissible or receivable between two arbitrary terminals on the network, S to an empty set, and T to 0, repeatedly performs, until T becomes not less than a predetermined value or U becomes an empty set, a process of obtaining the total number P of links through which at least one of the flows serving as elements of S passes, a process of obtaining a flow set S {r} obtained by adding r to S and of obtaining the total number P'(r) of the links through which at least one of the flows as elements of S {r} passes, a process of obtaining a difference P'(r) □P between P'(r) and P for each flow R and adding to S a flow r having a maximum difference, a process of excluding the flow added to S from U, and a process of adding to T the number of flows added to S, and selects the flows added to S as flows to be registered in the flow link table;
   a flow quality information collection unit which collects information of the QoS of the flow going through the network;
   a path information collection unit which collects path information of the network;
   a flow link table generation unit which generates the flow link table based on the collected information of the QoS and the path information; and
   an estimation unit which estimates a QoS degradation link as a QoS degradation point on the network based on the flow link table,
   wherein one or more of the flow set decision unit, the flow quality information collection unit, the path information collection unit, the flow link table generation unit, and the estimation unit are each implemented by the hardware.

27. A QoS degradation point estimation device according to claim 26, wherein said flow set decision unit comprises:
   a unit which sets the selected flow as a test flow; and
   a unit which instructs a terminal on the network to send the test flow to the network.

28. A QoS degradation point estimation device according to claim 26, wherein said estimation unit comprises:
   a non-degraded link removal unit which removes, from the flow link table, rows of non-degraded flows except a degraded flow whose quality is poorer than a predetermined degradation threshold and columns of links the non-degraded flows pass through, thereby generating a reduced flow link table; and
   a QoS degradation point estimation unit which estimates the QoS degradation link based on the reduced flow link table.

29. A QoS degradation point estimation device according to claim 28, wherein said QoS degradation point estimation unit estimates, out of links registered in the reduced flow link table, a link through which a maximum number of QoS degradation flows pass as the QoS degradation link.

30. A QoS degradation point estimation device according to claim 28, wherein said QoS degradation point estimation unit estimates, out of link sets each covering all QoS degradation flows registered in the reduced flow link table, a minimum link set having a minimum number of links as the QoS degradation link.

31. A non-transitory computer-readable recording medium recording a QoS degradation point estimation program which causes a computer operating as a QoS degradation point estimation device on a network to execute the steps of:
   before generating a flow link table which associates QoS of a flow going through a network with a link the flow passes through, setting H to a value that is ½ of the total number of links in the network, and selecting, in ascending order of an absolute value of a difference between H and the number of links to pass, a predetermined number of flows as flows to be registered in the flow link table or selecting, in ascending order of the absolute value of the difference between H and the number of links to pass, flows having absolute values between H and the number of links to pass that are not more than a predetermined threshold as flows to be registered in the flow link table;
   generating the flow link table based on the QoS of the flow going through the network and path information of the network; and
   estimating a QoS degradation link as a QoS degradation point on the network based on the flow link table.

32. A non-transitory computer-readable recording medium recording a QoS degradation point estimation program which causes a computer operating as a QoS degradation point estimation device on a network to execute the steps of:
   before generating a flow link table which associates QoS of a flow going through a network with a link the flow passes through, setting H to a value that is ½ of the total number of links of the network, defining a distance between two flows included in a set of all flows transmissible or receivable between two arbitrary terminals on the network as the number of incoincidences of links to pass between the two flows, calculating the distances for all combinations of flows, and selecting, in ascending order of an absolute value of a difference between H and the distance, a predetermined number of flow pairs as flows to be registered in the flow link table, or selecting, in ascending order of the absolute value of the difference between H and the distance, flow pairs having absolute values of the differences between H and the distances that are not more than a predetermined threshold as flows to be registered in the flow link table;

generating the flow link table based on the QoS of the flow going through the network and path information of the network; and estimating a QoS degradation link as a QoS degradation point on the network based on the flow link table.

33. A non-transitory computer-readable recording medium recording a QoS degradation point estimation program which causes a computer operating as a QoS degradation point estimation device on a network to execute the steps of:

before generating a flow link table which associates QoS of a flow going through a network with a link the flow passes through, setting U to a set of all flows transmissible or receivable between two arbitrary terminals on the network, S to an empty set, and T to 0, repeatedly performing, until T becomes not less than a predetermined value or U becomes an empty set, a process of obtaining the total number P of links through which at least one of the flows serving as elements of S passes, a process of obtaining a flow set S {r} obtained by adding r to S and of obtaining the total number P'(r) of the links through which at least one of the flows as elements of S {r} passes, a process of obtaining a difference P'(r) □P between P'(r) and P for each flow R and adding to S a flow r having a maximum difference, a process of excluding the flow added to S from U, and a process of adding to T the number of flows added to S, and selecting the flows added to S as flows to be registered in the flow link table;

generating the flow link table based on the QoS of the flow going through the network and path information of the network; and estimating a QoS degradation link as a QoS degradation point on the network based on the flow link table.

34. A QoS degradation point estimation device comprising:

flow set decision means for, before generating a flow link table which associates QoS of a flow going through a network with a link the flow passes through, setting H to a value that is ½ of the total number of links in the network, and selecting, in ascending order of an absolute value of a difference between H and the number of links to pass, a predetermined number of flows as flows to be registered in the flow link table or selecting, in ascending order of the absolute value of the difference between H and the number of links to pass, flows having absolute values between H and the number of links to pass that are not more than a predetermined threshold as flows to be registered in the flow link table;

flow quality information collection means for collecting information of the QoS of the flow going through the network;

path information collection means for collecting path information of the network;

flow link table generation means for generating the flow link table based on the collected information of the QoS and the path information; and estimation means for estimating a QoS degradation link as a QoS degradation point on the network based on the flow link table.

35. A QoS degradation point estimation device comprising:

flow set decision means for, before generating a flow link table which associates QoS of a flow going through a network with a link the flow passes through, setting H to a value that is ½ of the total number of links of the network, defining a distance between two flows included in a set of all flows transmissible or receivable between two arbitrary terminals on the network as the number of incoincidences of links to pass between the two flows, calculating the distances for all combinations of flows, and selecting, in ascending order of an absolute value of a difference between H and the distance, a predetermined number of flow pairs as flows to be registered in the flow link table, or selecting, in ascending order of the absolute value of the difference between H and the distance, flow pairs having absolute values of the differences between H and the distances that are not more than a predetermined threshold as flows to be registered in the flow link table;

flow quality information collection means for collecting information of the QoS of the flow going through the network;

path information collection means for collecting path information of the network;

flow link table generation means for generating the flow link table based on the collected information of the QoS and the path information; and estimation means for estimating a QoS degradation link as a QoS degradation point on the network based on the flow link table.

36. A QoS degradation point estimation device comprising:

flow set decision means for, before generating a flow link table which associates QoS of a flow going through a network with a link the flow passes through, setting U to a set of all flows transmissible or receivable between two arbitrary terminals on the network, S to an empty set, and T to 0, repeatedly performing, until T becomes not less than a predetermined value or U becomes an empty set, a process of obtaining the total number P of links through which at least one of the flows serving as elements of S passes, a process of obtaining a flow set S {r} obtained by adding r to S and of obtaining the total number P'(r) of the links through which at least one of the flows as elements of S {r} passes, a process of obtaining a difference P'(r) □P between P'(r) and P for each flow R and adding to S a flow r having a maximum difference, a process of excluding the flow added to S from U, and a process of adding to T the number of flows added to S, and selecting the flows added to S as flows to be registered in the flow link table;

flow quality information collection means for collecting information of the QoS of the flow going through the network;

path information collection means for collecting path information of the network;

flow link table generation means for generating the flow link table based on the collected information of the QoS and the path information; and estimation means for estimating a QoS degradation link as a QoS degradation point on the network based on the flow link table.

* * * * *